US012676362B2

(12) United States Patent
Huang et al.

(10) Patent No.:  US 12,676,362 B2
(45) Date of Patent:  Jul. 7, 2026

(54) BATTERY HEATING DEVICE AND CONTROL METHOD AND CIRCUIT THEREFOR, AND POWER DEVICE

(71) Applicant: CONTEMPORARY AMPEREX TECHNOLOGY (HONG KONG) LIMITED, Hong Kong (CN)

(72) Inventors: Xiaojian Huang, Ningde (CN); Xianxi Pan, Ningde (CN); Zhimin Dan, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 471 days.

(21) Appl. No.: 18/459,392

(22) Filed: Aug. 31, 2023

(65) Prior Publication Data

US 2023/0411734 A1     Dec. 21, 2023

Related U.S. Application Data

(63) Continuation of application No. PCT/CN2021/116736, filed on Sep. 6, 2021.

(51) Int. Cl.
H01M 10/657          (2014.01)
B60L 58/27          (2019.01)
(Continued)

(52) U.S. Cl.
CPC ........... H01M 10/657 (2015.04); B60L 58/27 (2019.02); H01M 10/4264 (2013.01);
(Continued)

(58) Field of Classification Search
CPC ............. H01M 10/657; H01M 10/615; H01M 10/4264; B60L 58/27
See application file for complete search history.

(56) References Cited

U.S. PATENT DOCUMENTS

| | | | |
|---|---|---|---|
| 7,990,098 | B2 | 8/2011 | Perisic et al. |
| 8,452,490 | B2 | 5/2013 | Lakirovich et al. |

(Continued)

FOREIGN PATENT DOCUMENTS

| | | |
|---|---|---|
| CN | 202042565 U | 11/2011 |
| CN | 104118331 A | 10/2014 |

(Continued)

OTHER PUBLICATIONS

Notice of Reasons for Refusal received in the corresponding Japanese application 2023-524100, mailed Apr. 22, 2024.

(Continued)

*Primary Examiner* — Christopher P Domone

(74) *Attorney, Agent, or Firm* — K&L Gates LLP

(57) ABSTRACT

Provided are a battery heating device and a control method and circuit therefor, and a power device. The battery heating device includes: a heating module including a first bridge arm, a second bridge arm, and an energy storage element; and a control module configured to control the first bridge arm and the second bridge arm, to form a circuit for discharging from a first battery cell to the energy storage element and a circuit for charging from the energy storage element and the first battery cell to a second battery cell, and/or to form a circuit for discharging from the second battery cell to the energy storage element and a circuit for charging from the energy storage element and the second battery cell to the first battery cell, for heating of the first battery cell and the second battery cell.

18 Claims, 5 Drawing Sheets

(51) Int. Cl.

| | | |
|---|---|---|
| *H01M 10/42* | (2006.01) |
| *H01M 10/615* | (2014.01) |
| *H01M 10/625* | (2014.01) |
| *H01M 10/63* | (2014.01) |
| *B60L 50/64* | (2019.01) |

(52) U.S. Cl.
CPC ....... *H01M 10/615* (2015.04); *H01M 10/625* (2015.04); *H01M 10/63* (2015.04); *B60L 50/64* (2019.02); *H01M 2220/20* (2013.01)

(56) References Cited

U.S. PATENT DOCUMENTS

| | | | |
|---|---|---|---|
| 9,975,447 | B2 | 5/2018 | Tokushige et al. |
| 2002/0024221 | A1 | 2/2002 | Grewe et al. |
| 2002/0096886 | A1 | 7/2002 | Schmitz et al. |
| 2011/0144861 | A1 | 6/2011 | Lakirovich et al. |
| 2012/0176082 | A1 | 7/2012 | Lee et al. |
| 2012/0301755 | A1 | 11/2012 | Axelsson et al. |
| 2014/0287293 | A1 | 9/2014 | Gross |
| 2014/0358352 | A1 | 12/2014 | Yamamoto |
| 2016/0318418 | A1 | 11/2016 | Tokushige et al. |
| 2019/0305393 | A1 | 10/2019 | Oguma |
| 2020/0168959 | A1 | 5/2020 | Hettrich |
| 2020/0207237 | A1 | 7/2020 | Zuo et al. |
| 2020/0235439 | A1 | 7/2020 | Frost et al. |
| 2021/0061128 | A1 | 3/2021 | Lee et al. |
| 2021/0143684 | A1 | 5/2021 | Sumiya |
| 2021/0354592 | A1 | 11/2021 | Zuo et al. |
| 2023/0023717 | A1 | 1/2023 | Tzeng et al. |
| 2023/0238603 | A1* | 7/2023 | Lian ........................ B60L 53/24 |
| | | | 307/9.1 |

FOREIGN PATENT DOCUMENTS

| | | | |
|---|---|---|---|
| CN | 105932363 | A | 9/2016 |
| CN | 106025443 | A | 10/2016 |
| CN | 107039708 | A | 8/2017 |
| CN | 107069145 | A | 8/2017 |
| CN | 109823234 | A | 5/2019 |
| CN | 109962660 | A | 7/2019 |
| CN | 110015202 | A | 7/2019 |
| CN | 110116653 | A | 8/2019 |
| CN | 110789400 | A | 2/2020 |
| CN | 110962692 | A | 4/2020 |
| CN | 111347900 | A | 6/2020 |
| CN | 111347924 | A | 6/2020 |
| CN | 111347937 | A | 6/2020 |
| CN | 111355430 | A | 6/2020 |
| CN | 111391717 | A | 7/2020 |
| CN | 111391718 | A | 7/2020 |
| CN | 111434513 | A | 7/2020 |
| CN | 111446519 | A | 7/2020 |
| CN | 111660875 | A | 9/2020 |
| CN | 112389214 | A | 2/2021 |
| CN | 212587580 | U | 2/2021 |
| CN | 112510272 | A | 3/2021 |
| CN | 112550079 | A | 3/2021 |
| CN | 112810467 | A | 5/2021 |
| CN | 112821842 | A | 5/2021 |
| CN | 112977171 | A | 6/2021 |
| CN | 113043870 | A | 6/2021 |
| CN | 113071346 | A | 7/2021 |
| CN | 113119802 | A | 7/2021 |
| CN | 213734669 | U | 7/2021 |
| CN | 113506934 | A | 10/2021 |
| DE | 102013226372 | A1 | 6/2015 |
| JP | 2004112903 | A | 4/2004 |
| JP | 2004336844 | A | 11/2004 |
| JP | 2011188600 | A | 9/2011 |
| JP | 2013187919 | A | 9/2013 |
| JP | 2014067697 | A | 4/2014 |
| JP | 2014226000 | A | 12/2014 |
| JP | 2016170000 | A | 9/2016 |
| JP | 2017212764 | A | 11/2017 |
| JP | 2020110042 | A | 7/2020 |
| JP | 2021002513 | A | 1/2021 |
| JP | 2021012853 | A | 2/2021 |
| JP | 2021013226 | A | 2/2021 |
| JP | 2021044949 | A | 3/2021 |
| JP | 2021093845 | A | 6/2021 |
| KR | 20200139201 | A | 12/2020 |
| KR | 1020200140919 | A | 12/2020 |
| WO | 2018030143 | A1 | 2/2018 |
| WO | 2019244680 | A1 | 12/2019 |
| WO | 2020125770 | A1 | 6/2020 |
| WO | 2020125771 | A1 | 6/2020 |
| WO | 2020259071 | A1 | 12/2020 |
| WO | 2021000784 | A1 | 1/2021 |
| WO | 2021/027879 | A1 | 2/2021 |
| WO | 2021019608 | A1 | 2/2021 |
| WO | 2021/057339 | A1 | 4/2021 |
| WO | 2021106195 | A1 | 6/2021 |
| WO | 2021135888 | A1 | 7/2021 |

OTHER PUBLICATIONS

Notice of Reasons for Refusal received in the corresponding Japanese application 2021-574847, mailed Feb. 13, 2024.

Notice of Allowance received in the counterpart U.S. Appl. No. 17/562,562, mailed on Jan. 6, 2025.

Notice of Reasons for Refusal received in the counterpart Japanese application 2024-507051, mailed on Jan. 21, 2025.

Request for the Submission of an Opinion received in the counterpart Korean application 10-2023-7020324, mailed on Feb. 13, 2025.

Notice of Reasons for Refusal received in the counterpart Japanese application 2024-514462, on Mar. 11, 2025.

Notification of Registration received in the corresponding Chinese application 202280004716.1, mailed Oct. 23, 2023.

Notice of Reasons for Refusal received in the corresponding Japanese application 2021-574847, mailed Oct. 10, 2023.

Notification of Registration received in the corresponding Chinese application 202180048180.9, mailed Oct. 16, 2023.

Notification of Registration received in the corresponding Chinese application 202280004725.0, mailed Nov. 9, 2023.

The extended European search report received in the corresponding European application 21964480.4, mailed on Aug. 12, 2024.

The extended European search report received in the corresponding European application 22851620.9, mailed on Oct. 23, 2024.

The international search report received in the corresponding international application PCT/CN2021/116736, mailed Apr. 14, 2022.

The written opinion received in the corresponding international application PCT/CN2021/116736, mailed Apr. 14, 2022.

The international search report received in the corresponding international application PCT/CN2022/088187, mailed Jun. 28, 2022.

The written opinion received in the corresponding international application PCT/CN2022/088187, mailed Jun. 28, 2022.

The international search report received in the corresponding international application PCT/CN2021/116735, mailed Apr. 1, 2022.

The written opinion received in the corresponding international application PCT/CN2021/116735, mailed Apr. 1, 2022.

The international search report received in the corresponding international application PCT/CN2022/088567, mailed Jul. 1, 2022.

The written opinion received in the corresponding international application PCT/CN2022/088567, mailed Jul. 1, 2022.

The international search report received in the corresponding international application PCT/CN2021/116736, mailed May 18, 2022.

The written opinion received in the corresponding international application PCT/CN2021/116736, mailed May 18, 2022.

The international search report received in the corresponding international application PCT/CN2021/132202, mailed Aug. 3, 2022.

The written opinion received in the corresponding international application PCT/CN2021/132202, mailed Aug. 3, 2022.

Notice of Allowance, mailed Mar. 2, 2026, for U.S. Appl. No. 18/307,791.

Notice of Allowance (with English Machine Translation), mailed Jan. 15, 2026, for corresponding Korean Patent Application Serial No. 10-2024-7007366.

(56) References Cited

OTHER PUBLICATIONS

Notice of Allowance (with English Machine Translation), mailed Jul. 29, 2025, for Chinese Patent Application Serial No. 202180032903. 6.

Notice of Allowance (with English Machine Translation), mailed Jun. 30, 2025, for Chinese Patent Application Serial No. 202180039361. 5.

Li et al., "Control Strategy for Battery Energy Storage System Based on Modular Multilevel Converters", Automation of Electric Power Systems, vol. 41, No. 9, May 10, 2017, pp. 144-150 (English Abstract Attached).

Li et al., "Research on lithium battery pack equalization technology based on energy conversion strategy", Power Supply Technology, Issue 1, Jan. 20, 2020, pp. 51-53 (English Abstract Attached).

Notice of Reasons for Refusal received in the corresponding Japanese application 2023-535941, mailed on May 13, 2024.

Notice of Reasons for Refusal received in the corresponding Japanese application 2023-537696, mailed on Jun. 24, 2024.

The Notice of Preliminary Rejection received in the counterpart KR Application No. 10-2024-7004327, dated Oct. 27, 2025, 23 pages with English translation.

The Reconsideration Report by Examiner before Appeal received in the counterpart JP Application No. 2024-514462, dated Nov. 19, 2025, 10 pages with English translation.

Non-Final Office Action, mailed May 4, 2026, for U.S. Appl. No. 18/322,897.

* cited by examiner

Battery heating device

110

Heating module          1110

Control module          1120

700

| Control a first bridge arm and a second bridge arm, to form a circuit for discharging from a first battery cell to an energy storage element and a circuit for charging from the energy storage element and the first battery cell to a second battery cell, for heating of the first battery cell and the second battery cell during charging and discharging | 710 |

| Control a first bridge arm and a second bridge arm, to form a circuit for discharging from a second battery cell to an energy storage element and a circuit for charging from the energy storage element and the second battery cell to a first battery cell, for heating of the first battery cell and the second battery cell during charging and discharging | 720 |

*FIG. 7*

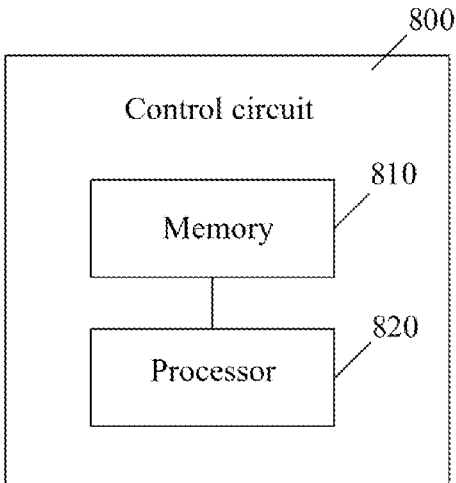

*FIG. 8*

BATTERY HEATING DEVICE AND CONTROL METHOD AND CIRCUIT THEREFOR, AND POWER DEVICE

CROSS-REFERENCE TO RELATED APPLICATIONS

The present application is a continuation of International Application No. PCT/CN2021/116736, filed on Sep. 6, 2021, the entire content of which is incorporated herein by reference.

TECHNICAL FIELD

The present application relates to the technical field of batteries, and in particular to a battery heating device, a control method for a battery heating device, a control circuit for a battery heating device, and a power device.

BACKGROUND ART

Due to the advantages of being high in energy density, recyclable in charging, and safe and environmentally friendly, traction batteries are widely applied in the fields of new energy vehicles, consumer electronics, energy storage systems, etc.

However, traction batteries may be subject to certain restrictions when used in a low temperature environment. Specifically, in a low temperature environment, the discharge capacity of a traction battery may be significantly reduced, and the battery is not able to be charged. Therefore, it is required to heat the traction battery in the low temperature environment, in order to allow for normal use of the traction battery. How to improve the heating efficiency of a traction battery has become an urgent problem to be solved.

SUMMARY OF THE INVENTION

Embodiments of the present application provide a battery heating device, a control method for a battery heating device, a control circuit for a battery heating device, and a power device, which can improve the heating efficiency of a traction battery.

In a first aspect, there is provided a battery heating device, which is connected to a traction battery and configured to heat the traction battery, where the traction battery includes a first battery cell and a second battery cell. The battery heating device includes:

a heating module including a first bridge arm, a second bridge arm, and an energy storage element; and a control module configured to control the first bridge arm and the second bridge arm, to form a circuit for discharging from the first battery cell to the energy storage element and a circuit for charging from the energy storage element and the first battery cell to the second battery cell, and/or to form a circuit for discharging from the second battery cell to the energy storage element and a circuit for charging from the energy storage element and the second battery cell to the first battery cell, for heating of the first battery cell and the second battery cell.

In an embodiment of the present application, the battery heating device may heat two battery cells at the same time. The battery heating device includes two bridge arms and an energy storage element. During charging and discharging, the two battery cells are connected in series. The two bridge arms are controlled to form a circuit for discharging from one of the battery cells to the energy storage element and a circuit for charging from the energy storage element and the battery cell to the other battery cell. In this way, the two battery cells are heated at the same time during the charging and discharging, and a relatively high heating efficiency is thus achieved.

In a possible implementation, a first end of the first bridge arm is connected to a first end of the first battery cell, a first end of the second bridge arm is connected to a first end of the second battery cell, and a second end of the first bridge arm, a second end of the second bridge arm, and a second end of the first battery cell are connected to a second end of the second battery cell, where the first bridge arm includes a first sub-bridge arm and a second sub-bridge arm, and the second bridge arm includes a third sub-bridge arm and a fourth sub-bridge arm; and the first end of the first battery cell and the first end of the second battery cell are positive electrodes, and the second end of the first battery cell and the second end of the second battery cell are negative electrodes; or the first end of the first battery cell and the first end of the second battery cell are negative electrodes, and the second end of the first battery cell and the second end of the second battery cell are positive electrodes.

In a possible implementation, a first end of the energy storage element is connected between the first sub-bridge arm and the second sub-bridge arm, and a second end of the energy storage element is connected between the third sub-bridge arm and the fourth sub-bridge arm; or a first end of the energy storage element is connected to the second end of the first bridge arm, and a second end of the energy storage element is connected to the second end of the second bridge arm.

In a possible implementation, the control module is specifically configured to:

control the first sub-bridge arm and the fourth sub-bridge arm to be switched on at the same time, to form a circuit, which includes the first battery cell, the first sub-bridge arm, the energy storage element, and the fourth sub-bridge arm, for discharging from the first battery cell to the energy storage element; and control the first sub-bridge arm and the third sub-bridge arm to be switched on at the same time, to form a circuit, which includes the first battery cell, the first sub-bridge arm, the energy storage element, the third sub-bridge arm, and the second battery cell, for charging from the first battery cell and the energy storage element to the second battery cell; and/or control the second sub-bridge arm and the third sub-bridge arm to be switched on at the same time, to form a circuit, which includes the second battery cell, the third sub-bridge arm, the energy storage element, and the second sub-bridge arm, for discharging from the second battery cell to the energy storage element; and control the first sub-bridge arm and the third sub-bridge arm to be switched on at the same time, to form a circuit, which includes the second battery cell, the third sub-bridge arm, the energy storage element, the first sub-bridge arm, and the first battery cell, for charging from the second battery cell and the energy storage element to the first battery cell.

In a possible implementation, a first end of the energy storage element is connected between the first sub-bridge arm and the second sub-bridge arm, and a second end of the energy storage element is connected between the third sub-bridge arm and the fourth sub-bridge arm; or a first end of the energy storage element is connected to the first end of the first bridge arm, and a second end of the energy storage element is connected to the first end of the second bridge arm.

In a possible implementation, the control module is specifically configured to:

control the second sub-bridge arm and the third sub-bridge arm to be switched on at the same time, to form a circuit, which includes the first battery cell, the second sub-bridge arm, the energy storage element, and the third sub-bridge arm, for discharging from the first battery cell to the energy storage element; and control the second sub-bridge arm and the fourth sub-bridge arm to be switched on at the same time, to form a circuit, which includes the first battery cell, the second sub-bridge arm, the energy storage element, the fourth sub-bridge arm, and the second battery cell, for charging from the first battery cell and the energy storage element to the second battery cell; and/or control the first sub-bridge arm and the fourth sub-bridge arm to be switched on at the same time, to form a circuit, which includes the second battery cell, the fourth sub-bridge arm, the energy storage element, and the first sub-bridge arm, for discharging from the second battery cell to the energy storage element; and control the second sub-bridge arm and the fourth sub-bridge arm to be switched on at the same time, to form a circuit, which includes the second battery cell, the fourth sub-bridge arm, the energy storage element, the second sub-bridge arm, and the first battery cell, for charging from the second battery cell and the energy storage element to the first battery cell.

In the foregoing embodiment, a reasonable control timing is designed to control the switching on and off of each of the sub-bridge arms, to form a circuit for discharging from the first battery cell to the energy storage element and a circuit for charging from the energy storage element and the first battery cell to the second battery cell, and/or to form a circuit for discharging from the second battery cell to the energy storage element and a circuit for charging from the energy storage element and the second battery cell to the first battery cell. The discharging circuit and the charging circuit are switched alternately, which enables repeated charging and discharging between the first battery cell and the second battery cell, thereby implementing the heating of the first battery cell and the second battery cell during charging and discharging.

In a possible implementation, the first sub-bridge arm includes a first switch transistor, the second sub-bridge arm includes a second switch transistor, the third sub-bridge arm includes a third switch transistor, and the fourth sub-bridge arm includes a fourth switch transistor. The control module implements the switching on and off of the first sub-bridge arm, the second sub-bridge arm, the third sub-bridge arm, and the fourth sub-bridge arm respectively by controlling the first switch transistor, the second switch transistor, the third switch transistor, and the fourth switch transistor.

In a possible implementation, a state switching switch is connected between the first end of the first battery cell and the first end of the second battery cell, or a state switching switch is connected between the second end of the first battery cell and the second end of the second battery cell. The control module is further configured to: control the state switching switch to be opened, so that the first battery cell is connected in series with the second battery cell.

In this embodiment, a state switching switch is further connected between the two battery cells, and the mode of connection between the first battery cell and the second battery cell may be switched using the state switching switch. If the first battery cell and the second battery cell are to be heated, the state switching switch may be controlled to be opened, so that the first battery cell is connected in series with the second battery cell. Additionally, in other situations, for example, if the first battery cell and the second battery cell will supply power to a power system, the state switching switch may be controlled to be closed, so that first battery cell is connected in parallel to the second battery cell.

In a possible implementation, the energy storage element includes an inductor; or the energy storage element includes an inductor and a first capacitor connected in series.

In a possible implementation, a second capacitor is connected in parallel to the first battery cell at the two ends, and a third capacitor is connected in parallel to the second battery cell at the two ends. The second capacitor and the third capacitor may implement functions such as voltage regulating, thereby improving the voltage stability of the traction battery.

In a possible implementation, the first battery cell and the second battery cell are further connected to a drive circuit of a motor, to provide power to the drive circuit.

In a second aspect, there is provided a control method for a battery heating device, which is connected to a traction battery and configured to heat the traction battery, where the battery heating device includes a first bridge arm, a second bridge arm, and an energy storage element, and the traction battery includes a first battery cell and a second battery cell. The control method includes:

controlling the first bridge arm and the second bridge arm, to form a circuit for discharging from the first battery cell to the energy storage element and a circuit for charging from the energy storage element and the first battery cell to the second battery cell, and/or to form a circuit for discharging from the second battery cell to the energy storage element and a circuit for charging from the energy storage element and the second battery cell to the first battery cell, for heating of the first battery cell and the second battery cell.

In an embodiment of the present application, two battery cells may be heated at the same time. During charging and discharging, the two battery cells are connected in series. A reasonable control timing is designed to control the two bridge arms in the battery heating device, to form a circuit for discharging from one of the battery cells to the energy storage element and a circuit for charging from the energy storage element and the battery cell to the other battery cell. In this way, the two battery cells are heated at the same time during the charging and discharging, and a relatively high heating efficiency is thus achieved.

In a possible implementation, a first end of the first bridge arm is connected to a first end of the first battery cell, a first end of the second bridge arm is connected to a first end of the second battery cell, and a second end of the first bridge arm, a second end of the second bridge arm, and a second end of the first battery cell are connected to a second end of the second battery cell, where the first bridge arm includes a first sub-bridge arm and a second sub-bridge arm, and the second bridge arm includes a third sub-bridge arm and a fourth sub-bridge arm; and the first end of the first battery cell and the first end of the second battery cell are positive electrodes, and the second end of the first battery cell and the second end of the second battery cell are negative electrodes; or the first end of the first battery cell and the first end of the second battery cell are negative electrodes, and the second end of the first battery cell and the second end of the second battery cell are positive electrodes.

In a possible implementation, a first end of the energy storage element is connected between the first sub-bridge arm and the second sub-bridge arm, and a second end of the energy storage element is connected between the third sub-bridge arm and the fourth sub-bridge arm; or a first end of the energy storage element is connected to the second end of the first bridge arm, and a second end of the energy storage element is connected to the second end of the second bridge arm.

In a possible implementation, the controlling the first bridge arm and the second bridge arm includes: receiving a heating request message; and generating a first control signal based on the heating request message, where the first control signal is used to:

control the first sub-bridge arm and the fourth sub-bridge arm to be switched on at the same time, to form a circuit, which includes the first battery cell, the first sub-bridge arm, the energy storage element, and the fourth sub-bridge arm, for discharging from the first battery cell to the energy storage element; and control the first sub-bridge arm and the third sub-bridge arm to be switched on at the same time, to form a circuit, which includes the first battery cell, the first sub-bridge arm, the energy storage element, the third sub-bridge arm, and the second battery cell, for charging from the first battery cell and the energy storage element to the second battery cell; and/or control the second sub-bridge arm and the third sub-bridge arm to be switched on at the same time, to form a circuit, which includes the second battery cell, the third sub-bridge arm, the energy storage element, and the second sub-bridge arm, for discharging from the second battery cell to the energy storage element; and control the first sub-bridge arm and the third sub-bridge arm to be switched on at the same time, to form a circuit, which includes the second battery cell, the third sub-bridge arm, the energy storage element, the first sub-bridge arm, and the first battery cell, for charging from the second battery cell and the energy storage element to the first battery cell.

In a possible implementation, a first end of the energy storage element is connected between the first sub-bridge arm and the second sub-bridge arm, and a second end of the energy storage element is connected between the third sub-bridge arm and the fourth sub-bridge arm; or a first end of the energy storage element is connected to the first end of the first bridge arm, and a second end of the energy storage element is connected to the first end of the second bridge arm.

In a possible implementation, the controlling the first bridge arm and the second bridge arm includes: receiving a heating request message; and generating a third control signal based on the heating request message, where the third control signal is used to:

control the second sub-bridge arm and the third sub-bridge arm to be switched on at the same time, to form a circuit, which includes the first battery cell, the second sub-bridge arm, the energy storage element, and the third sub-bridge arm, for discharging from the first battery cell to the energy storage element; and control the second sub-bridge arm and the fourth sub-bridge arm to be switched on at the same time, to form a circuit, which includes the first battery cell, the second sub-bridge arm, the energy storage element, the fourth sub-bridge arm, and the second battery cell, for charging from the first battery cell and the energy storage element to the second battery cell; and/or control the first sub-bridge arm and the fourth sub-bridge arm to be switched on at the same time, to form a circuit, which includes the second battery cell, the fourth sub-bridge arm, the energy storage element, and the first sub-bridge arm, for discharging from the second battery cell to the energy storage element; and control the second sub-bridge arm and the fourth sub-bridge arm to be switched on at the same time, to form a circuit, which includes the second battery cell, the fourth sub-bridge arm, the energy storage element, the second sub-bridge arm, and the first battery cell, for charging from the second battery cell and the energy storage element to the first battery cell.

In the foregoing embodiment, a reasonable control timing is designed to control the switching on and off of each of the sub-bridge arms, to form a circuit for discharging from the first battery cell to the energy storage element and a circuit for charging from the energy storage element and the first battery cell to the second battery cell, and/or to form a circuit for discharging from the second battery cell to the energy storage element and a circuit for charging from the energy storage element and the second battery cell to the first battery cell. The discharging circuit and the charging circuit are switched alternately, which enables repeated charging and discharging between the first battery cell and the second battery cell, thereby implementing the heating of the first battery cell and the second battery cell during charging and discharging.

In a possible implementation, the control method further includes: receiving a heating stop message; and generating a second control signal based on the heating stop message, where the second control signal is used to control the battery heating device to stop heating the traction battery.

In a possible implementation, the first sub-bridge arm includes a first switch transistor, the second sub-bridge arm includes a second switch transistor, the third sub-bridge arm includes a third switch transistor, and the fourth sub-bridge arm includes a fourth switch transistor. The switching on and off of the first sub-bridge arm, the second sub-bridge arm, the third sub-bridge arm, and the fourth sub-bridge arm are respectively implemented by controlling the first switch transistor, the second switch transistor, the third switch transistor, and the fourth switch transistor.

In a possible implementation, a state switching switch is connected between the first end of the first battery cell and the first end of the second battery cell, or a state switching switch is connected between the second end of the first battery cell and the second end of the second battery cell. The control method further includes: controlling the state switching switch to be opened, so that the first battery cell is connected in series with the second battery cell.

In a possible implementation, the energy storage element includes an inductor; or the energy storage element includes an inductor and a first capacitor connected in series.

In a possible implementation, a second capacitor is connected in parallel to the first battery cell at the two ends, and a third capacitor is connected in parallel to the second battery cell at the two ends. The second capacitor and the third capacitor may implement functions such as voltage regulating, thereby improving the voltage stability of the traction battery.

In a possible implementation, the first battery cell and the second battery cell are further connected to a drive circuit of a motor, to provide power to the drive circuit.

In a third aspect, a control circuit for a battery heating device is provided. The control circuit includes a processor configured to perform the method in the second aspect or any of the possible implementations in the second aspect.

In a fourth aspect, a power device is provided. The power device includes: a traction battery including a first battery cell and a second battery cell; a battery heating device in the first aspect or any of the possible implementations in the first aspect, which is connected to the traction battery and configured to heat the traction battery; and a motor, where a drive circuit of the motor is connected to the traction battery, and the traction battery is configured to provide power to the drive circuit.

Based on the above technical solutions, the battery heating device may heat two battery cells at the same time. The battery heating device includes two bridge arms and an energy storage element. During charging and discharging, the two battery cells are connected in series. The two bridge arms are controlled to form a circuit for discharging from one of the battery cells to the energy storage element and a circuit for charging from the energy storage element and the battery cell to the other battery cell. In this way, the two battery cells are heated at the same time during the charging and discharging, and a relatively high heating efficiency is thus achieved.

BRIEF DESCRIPTION OF THE DRAWINGS

In order to illustrate the technical solutions of the embodiments of the present application more clearly, the drawings required in the description of the embodiments of the present application will be described briefly below. Obviously, the drawings described below are merely some embodiments of the present application, and for those of ordinary skill in the art, other drawings can also be obtained from these drawings without any creative efforts.

FIG. 7 is a schematic flowchart of a control method for a battery heating device according to an embodiment of the present application;

FIG. 8 is a schematic block diagram of a control circuit for a battery heating device according to an embodiment of the present application.

DETAILED DESCRIPTION OF EMBODIMENTS

Figures 1, 2:
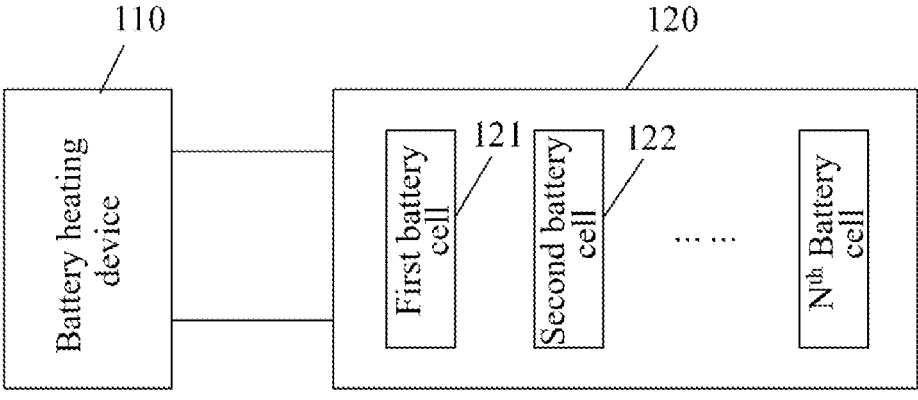
FIG. 1 is a schematic diagram of an application scenario of a battery heating device according to an embodiment of the present application.
FIG. 2 is a schematic block diagram of a battery heating device according to an embodiment of the present application.

The implementations of the present application will be further described in detail below in conjunction with the accompanying drawings and embodiments. The following detailed description of the embodiments and the accompanying drawings are used to illustrate the principle of the present application by way of example but should not be used to limit the scope of the present application. That is, the present application is not limited to the described embodiments.

In the description of the present application, it should be noted that "a plurality of" means two or more, unless otherwise specified. The orientation or position relationship indicated by the terms "upper", "lower", "left", "right", "inner", "outer", etc. is only for the convenience of describing the present application and simplifying the description, rather than indicating or implying that the device or element referred to must have a particular orientation or be constructed and operated in a particular orientation, and therefore should not be construed as a limitation on the present application. In addition, the terms "first", "second", "third", etc. are used for descriptive purposes only, and should not be construed as indicating or implying the relative importance. The term "perpendicular" does not mean being perpendicular in the strict sense, but within an allowable range of errors. The term "parallel" does not mean being parallel in the strict sense, but within an allowable range of errors.

The orientation terms in the following description all indicate directions shown in the drawings, but do not limit the specific structure in the present application. In the description of the present application, it should also be noted that the terms "disposing", "connecting", and "connection" should be interpreted in the broad sense unless explicitly defined and limited otherwise. For example, the terms may mean a fixed connection, a detachable connection, or an integral connection, or may mean a direct connection, or an indirect connection by means of an intermediate medium. For those of ordinary skill in the art, the specific meanings of the terms mentioned above in the present application can be construed according to specific circumstances.

With the development of times, new energy vehicles, due to their advantages of being environmentally friendly, low in noise and usage cost, etc., have a great market prospect and can effectively facilitate energy saving and emission reduction, which is conducive to the development and progress of the society.

Due to electro-chemical properties of traction batteries, charge and discharge capabilities of a traction battery in a low temperature environment may be greatly limited, which seriously affects the experience of a customer when using a vehicle in winter. Therefore, it is required to heat the traction battery in the low temperature environment, in order to allow for normal use of the traction battery.

The traction battery in the embodiments of the present application may be a lithium-ion battery, a lithium metal battery, a lead-acid battery, a nickel-cadmium battery, a nickel-hydrogen battery, a lithium-sulfur battery, a lithium-air battery, a sodium-ion battery, or the like, which is not limited herein. In terms of scale, the traction battery in the embodiments of the present application may be a battery cell, or may be a battery module or a battery pack, which is not limited herein. In terms of application scenarios, the traction battery may be applied to power devices such as cars and ships. For example, it may be applied to an electric vehicle to supply power to the motor of the electric vehicle as a power source of the electric vehicle. The traction battery may further supply power to other power consuming apparatuses in the electric vehicle, such as an in-vehicle air conditioner and a vehicle-mounted player.

For ease of description, the traction battery being applied to the new energy vehicle (i.e., an electric vehicle) is taken as an example to explain the solutions of the present application.

When the traction battery includes a plurality of battery cells, the following heating methods are usually employed in the prior art. The first method is to heat the battery cells in sequence, and the second method is to connect the plurality of battery cells in parallel and then heat same at the same time. However, the first method above prolongs the heating time, and the second method above leads to the current for heating being shunted. The two methods both result in a reduction in the heating efficiency and thus have an impact on the user experience.

For the reasons, the present application provides a dual-branch battery heating solution, in which two battery cells are connected in series by way of reasonable control, and are then heated at the same time, such that the efficiency of heating the battery cells is improved due to the current for heating being not shunted.

FIG. 1 is a schematic diagram of an application scenario of a battery heating device according to an embodiment of the present application. As shown in FIG. 1, the battery heating device 110 is connected to a traction battery 120. The battery heating device 110 is configured to heat the traction battery 120. The traction battery 120 includes N battery cells, such as a first battery cell, a second battery cell, . . . , an N$^{th}$ battery cell shown in FIG. 1, where N is a positive integer greater than or equal to 2. The battery heating device 110 according to the embodiments of the present application may, at a time, heat two of the battery cells at the same time. In other words, the N battery cells may be divided into a plurality of groups, two for each group, and the battery heating device 110 heats one of the groups of battery cells at a time. Neither the way in which the N battery cells are grouped nor the sequence in which the groups of battery cells are heated is limited in the embodiments of the present application. With a first battery cell and a second battery cell as an example, the way in which the battery heating device 110 heats the first battery cell and the second battery cell at the same time is described below.

In addition, the traction battery 120 may further be connected to a power system, the power system including a motor, etc. The traction battery 120 may be connected to a drive circuit of the motor, to provide power to the drive circuit of the motor, thereby allowing for an electric vehicle equipped with the traction battery 120 to travel.

In an implementation, a battery management system (BMS) for the traction battery 120 collects state information of the traction battery 120, such as a battery temperature, a state of charge (SOC), a voltage signal and a current signal, and determines whether the traction battery 120 needs to be heated based on the state information. If it is determined that the traction battery 120 needs to be heated, the BMS may send a heating request to a vehicle control unit (VCU). The VCU determines, based on the heating request sent by the BMS, whether to turn the battery heating device 110 on to heat the traction battery 120.

For example, after receiving the heating request sent by the BMS, the VCU may determine, based on the SOC of the traction battery 120, whether to heat the traction battery 120 using the battery heating device 110. If the traction battery 120 is fully charged, i.e., has a high SOC, which is, for example, higher than a threshold, the traction battery 120 may be heated using the battery heating device 110.

For another example, if the traction battery 120 has insufficient power, i.e., has a low SOC, which is, for example, lower than a threshold, the traction battery may not be heated using the battery heating device 110, in order to reduce the loss during battery heating. A motor controller, e.g., a microprogrammed control unit (MCU), may determine the state of the motor based on voltage, current and other information of the motor, and then send the state of the motor to the VCU. Therefore, if the motor is in a normal operating state at this time, the temperature of the traction battery 120 may be increased or maintained using heat generated by the operating loss of the motor. For example, the heat generated by the operating loss of the motor during vehicle traveling is used to heat coolant of the traction battery 120, which coolant is then used to increase or maintain the temperature of the traction battery 120.

Alternatively, when the SOC of the traction battery 120 is low, the battery heating device 110 may also be turned on to heat the traction battery 120, but the duration of a heating period of the battery heating device 110 is adjusted, or the heating frequency of the battery heating device 110 is adjusted.

The usage scenario of the battery heating device 110 is not limited in the present application. The battery heating device 110 according to the embodiments of the present application may be used to heat the traction battery 120 as needed.

During the heating of the traction battery 120 by the battery heating device 110, the BMS for the traction battery 120 may also monitor whether there is an anomaly in the temperature of the traction battery 120. If there is an anomaly in the temperature of the traction battery 120, the BMS may send information about the temperature anomaly to the VCU, and then the VCU controls the battery heating device 110 to stop heating the traction battery 120. In this case, the temperature of the traction battery 120 may be increased or maintained using heat generated by the operating loss of the motor. For example, the heat generated by the operating loss of the motor is used to heat coolant of the traction battery 120, which coolant is then used to increase or maintain the temperature of the traction battery 120.

During the heating of the traction battery 120 by the battery heating device 110, if the temperature of the traction battery 120 meets requirements, the VCU may control the battery heating device 110 to stop heating the traction battery 120. In this case, the temperature of the traction battery 120 may be maintained using heat generated by the operating loss of the motor. For example, the heat generated by the operating loss of the motor is used to heat coolant of the traction battery 120, which coolant is then used to maintain the temperature of the traction battery 120.

The solution in which the battery heating device 110 according to the embodiments of the present application is used to heat the traction battery 120 is described below with reference to FIGS. 2 to 4.

FIG. 2 is a schematic block diagram of a battery heating device 110 according to an embodiment of the present application. As shown in FIG. 2, the battery heating device 110 includes a heating module 1110 and a control module 1120. The traction battery 120 includes the first battery cell 121 and the second battery cell 122. The battery heating device 110 may heat the first battery cell 121 and the second battery cell 122 at the same time.

The heating module 1110 includes a first bridge arm 1111, a second bridge arm 1112, and an energy storage element 1113. The energy storage element 1113 may be, for example, an inductor L, or may be an inductor L and a first capacitor connected in series.

A second capacitor C1 may further be, for example, connected in parallel to the first battery cell 121 at both ends, and a third capacitor C2 may further be, for example, connected in parallel to the second battery cell 122 at both ends. The second capacitor C1 and the third capacitor C2 may implement functions such as voltage regulating, thereby reducing voltage fluctuations of the first battery cell 121 and the second battery cell 122, and improving the voltage stability of the first battery cell 121 and the second battery cell 122. In this way, during vehicle driving, requirements of the motor controller for the sampling precision of battery voltages may be lowered.

The control module 1120 is configured to: control the first bridge arm 1111 and the second bridge arm 1112, to form a circuit for discharging from the first battery cell 121 to the energy storage element 1113 and a circuit for charging from the energy storage element 1113 and the first battery cell 121 to the second battery cell 122, for heating of the first battery cell 121 and the second battery cell 122 during charging and discharging; an/or control the first bridge arm 1111 and the second bridge arm 1112, to form a circuit for discharging from the second battery cell 122 to the energy storage element 1113 and a circuit for charging from the energy storage element 1113 and the second battery cell 122 to the first battery cell 121, for heating of the first battery cell 121 and the second battery cell 122 during charging and discharging.

The control module 1120 may be the VCU, or may be a control module relatively independent of the VCU, such as a control module specially provided for the battery heating device 110, which is not limited in the embodiments of the present application.

It can be seen that when the battery heating device 110 heats the first battery cell 121 and the second battery cell 122, the control module 1120 needs to control the first bridge arm 1111 and the second bridge arm 1112 of the heating module 1110 in such a way that the first bridge arm 1111 and the second bridge arm 1112 are switched on or off, to form a circuit for discharging from one of the first battery cell 121 and the second battery cell 122 to the energy storage element and a circuit for charging from the battery cell and the energy storage element to the other battery cell. The discharging circuit and the charging circuit are switched alternately, which may result in an increase in the temperature of the battery cells due to the flow of currents in both battery cells during charging and discharging, thereby implementing the heating of the two battery cells at the same time with a relatively high heating efficiency.

In an implementation, a first end E11 of the first bridge arm 1111 is connected to a first end of the first battery cell 121, a first end E21 of the second bridge arm 1112 is connected to a first end of the second battery cell 122, and a second end E12 of the first bridge arm 1111, a second end E22 of the second bridge arm 1112, and a second end of the first battery cell 121 are connected to a second end of the second battery cell 122. The first bridge arm 1111 includes a first sub-bridge arm 1101 and a second sub-bridge arm 1102, and the second bridge arm 1112 includes a third sub-bridge arm 1103 and a fourth sub-bridge arm 1104.

The first end of the first battery cell 121 is a positive electrode of the first battery cell 121, and the second end of the first battery cell 121 is a negative electrode of the first battery cell 121; and the first end of the second battery cell 122 is a positive electrode of the second battery cell 122, and the second end of the second battery cell 122 is a negative electrode of the second battery cell 122.

Alternatively, the first end of the first battery cell 121 is a negative electrode of the first battery cell 121, and the second end of the first battery cell 121 is a positive electrode of the first battery cell 121; and the first end of the second battery cell 122 is a negative electrode of the second battery cell 122, and the second end of the second battery cell 122 is a positive electrode of the second battery cell 122.

Further, a state switching switch is connected between the first end E11 of the first battery cell 121 and the first end E21 of the second battery cell 122, or a state switching switch is connected between the second end E12 of the first battery cell 121 and the second end E22 of the second battery cell 122. The state switching switch is, for example, a switch transistor V15 shown in FIGS. 3 to 6. The control module 1120 is further configured to control the state switching switch to be opened, so that the first battery cell 121 is connected in series with the second battery cell 122.

The mode of connection between the first battery cell 121 and the second battery cell 122 may be switched using the state switching switch. Therefore, if the first battery cell and the second battery cell need to be heated, the state switching switch may be controlled to be opened, so that the first battery cell 121 is connected in series with the second battery cell 122. Additionally, in other situations, for example, if the first battery cell 121 and the second battery cell 122 will supply power to a power system, etc., the state switching switch may be controlled to be closed, so that the first battery cell is connected in parallel to the second battery cell.

Here, the expression "connected in series" may mean that the positive electrode of the first battery cell 121 is connected to the positive electrode of the second battery cell 122, and the negative electrode of the first battery cell 121 is connected to the negative electrode of the second battery cell 122. In this way, currents may flow between the first battery cell 121 and the second battery cell 122, and energy may be exchanged between the first battery cell 121 and the second battery cell 122.

The energy storage element 1113 of the present application may be connected between the first bridge arm 1111 and the second bridge arm 1112. For example, as shown in FIGS. 3 and 4, one end of the energy storage element 1113 is connected between the first sub-bridge arm 1101 and the second sub-bridge arm 1102, and the other end of the energy storage element 1113 is connected between the third sub-bridge arm 1103 and the fourth sub-bridge arm 1104.

Figure 5:
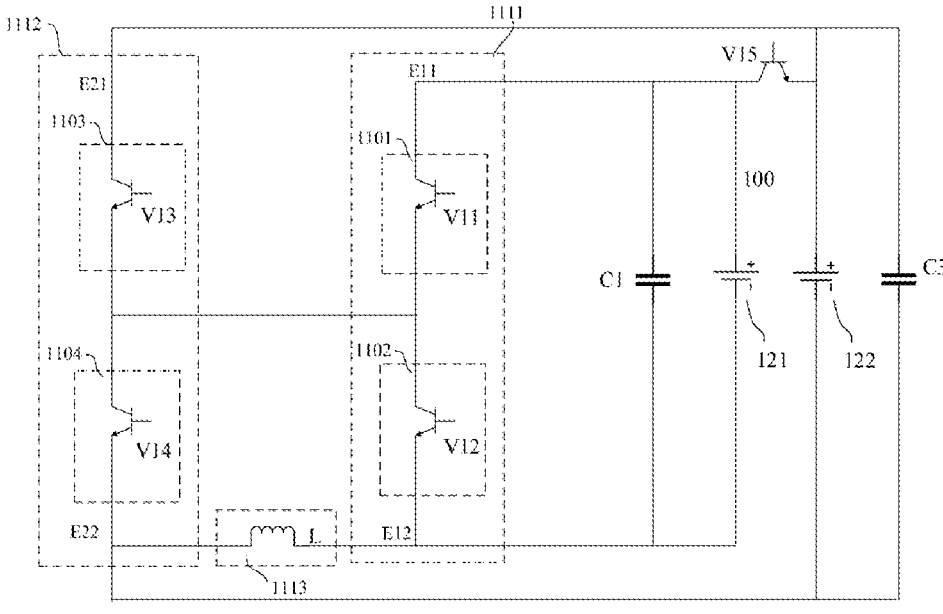
FIG. 5 is a schematic diagram of another possible implementation based on the battery heating device shown in FIG. 2.

For another example, as shown in FIG. 5, one end of the energy storage element 1113 is connected to the second end E12 of the first bridge arm 1111, and the other end of the energy storage element 1113 is connected to the second end E22 of the second bridge arm 1112.

Figure 6:
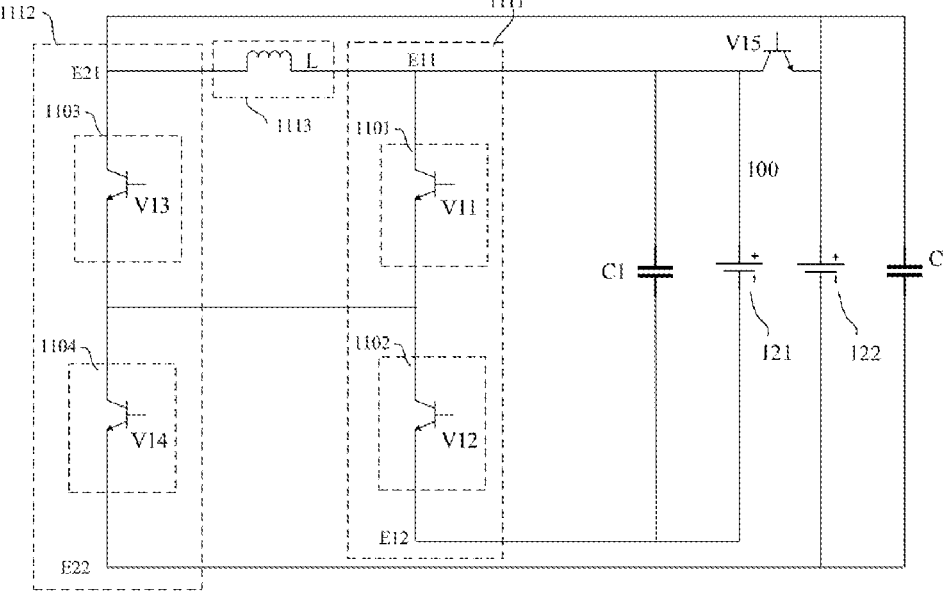
FIG. 6 is a schematic diagram of another possible implementation based on the battery heating device shown in FIG. 2.

For another example, as shown in FIG. 6, one end of the energy storage element 1113 is connected to the first end E11 of the first bridge arm 1111, and the other end of the energy storage element 1113 is connected to the first end E21 of the second bridge arm 1112.

Figure 3:
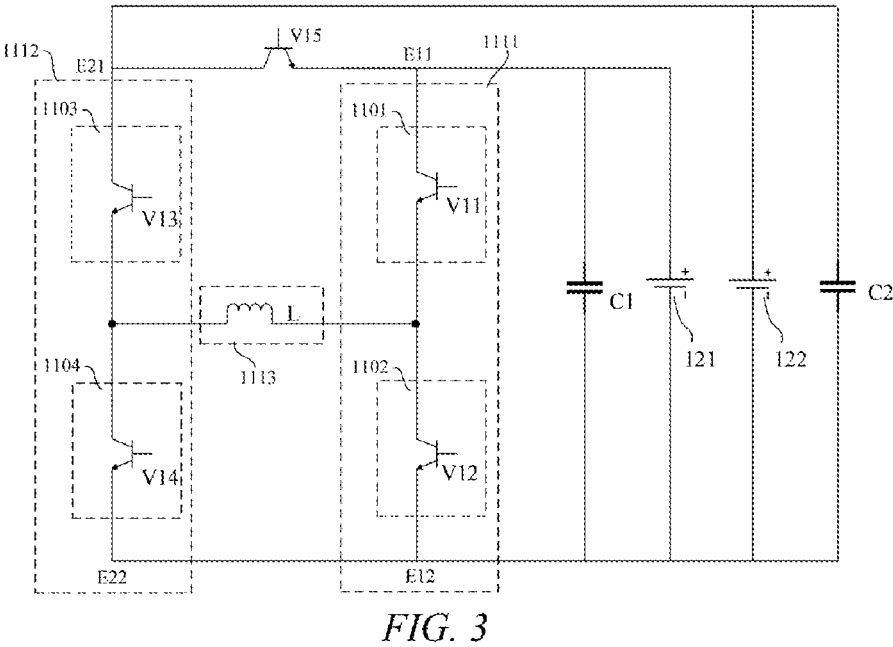
FIG. 3 is a schematic diagram of a possible implementation based on the battery heating device shown in FIG. 2.
Figure 4:
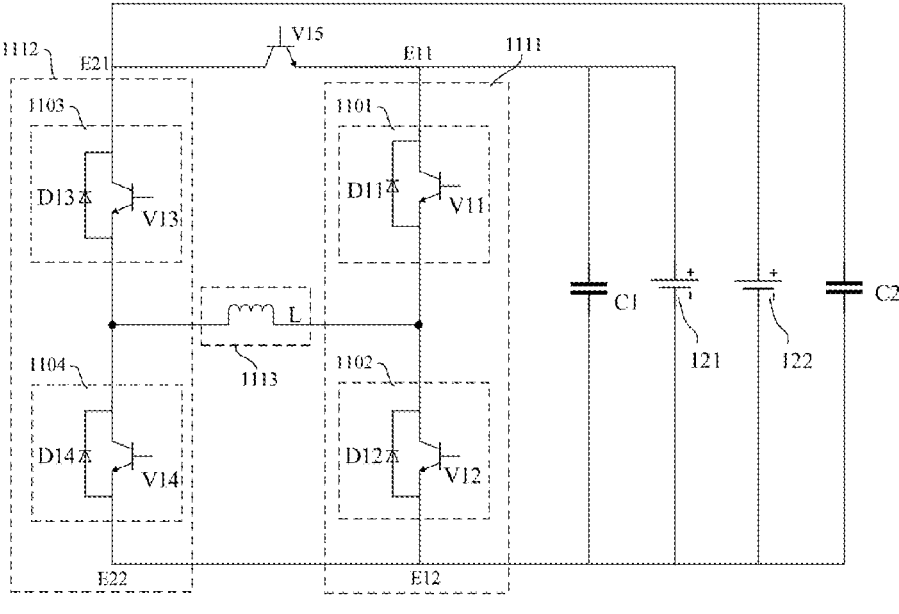
FIG. 4 is a schematic diagram of another possible implementation based on the battery heating device shown in FIG. 2.

In an implementation, for the heating module 1110 shown in FIGS. 3 to 5, when the first battery cell 121 and the second battery cell 122 connected in series are to be heated, the control module 1120 may: control the first sub-bridge arm 1101 and the fourth sub-bridge arm 1104 to be switched on at the same time, to form a circuit, which includes the first battery cell 121, the first sub-bridge arm 1101, the energy storage element 1113, and the fourth sub-bridge arm 1104, for discharging from the first battery cell 121 to the energy storage element 1113; and control the first sub-bridge arm 1101 and the third sub-bridge arm 1103 to be switched on at the same time, to form a circuit, which includes the first battery cell 121, the first sub-bridge arm 1101, the energy storage element 1113, the third sub-bridge arm 1103, and the second battery cell 122, for charging from the first battery cell 121 and the energy storage element 1113 to the second battery cell 122.

Alternatively, for the heating module 1110 shown in FIGS. 3 to 5, when the first battery cell 121 and the second battery cell 122 connected in series are to be heated, the control module 1120 may also: control the second sub-bridge arm 1102 and the third sub-bridge arm 1103 to be switched on at the same time, to form a circuit, which includes the second battery cell 122, the third sub-bridge arm 1103, the energy storage element 1113, and the second sub-bridge arm 1102, for discharging from the second battery cell 122 to the energy storage element 1113; and control the first sub-bridge arm 1101 and the third sub-bridge arm 1103 to be switched on at the same time, to form a circuit, which includes the second battery cell 122, the third sub-bridge arm 1103, the energy storage element 1113, the first sub-bridge arm 1101, and the first battery cell 121, for charging from the second battery cell 122 and the energy storage element 1113 to the first battery cell 121.

For example, the process of battery heating is described below in detail with reference to FIGS. 3 to 5 by taking the first end of the first battery cell 121 as the positive electrode of the first battery cell 121, the second end of the first battery cell 121 as the negative electrode of the first battery cell 121, the first end of the second battery cell 122 as the positive electrode of the second battery cell 122, the second end of the second battery cell 122 as the negative electrode of the second battery cell 122, and the energy storage element 1113 as the inductor L.

In an implementation, for the heating module 1110 shown in FIGS. 3 to 5, the first sub-bridge arm 1101 includes a first switch transistor V11, the second sub-bridge arm 1102 includes a second switch transistor V12, the third sub-bridge arm 1103 includes a third switch transistor V13, and the fourth sub-bridge arm 1104 includes a fourth switch transistor V14. The control module 1120 implements the switching on of the first sub-bridge arm 1101, the second sub-bridge arm 1102, the third sub-bridge arm 1103, and the fourth sub-bridge arm 1104 respectively by controlling the first switch transistor V11, the second switch transistor V12, the third switch transistor V13, and the fourth switch transistor V14.

Specifically, in an implementation, for the heating module 1110 shown in FIGS. 3 to 5, each heating period may include a first stage and a second stage. In the first stage, the first switch transistor V11 and the fourth switch transistor V14 are closed, and the second switch transistor V12 and the third switch transistor V13 are opened, to form a circuit including the first battery cell 121, the first switch transistor V11, the inductor L, and the fourth switch transistor V14, where the circuit is used for discharging of the first battery cell 121 and energy storage of the inductor L, and the path of discharge from the first battery cell 121 to the inductor L is: from the positive electrode of the first battery cell 121 to V11, to L, to V14, and to the negative electrode of the first battery cell 121. In the second stage, the first switch transistor V11 and the third switch transistor V13 are closed, and the second switch transistor V12 and the fourth switch transistor V14 are opened, to form a circuit including the first battery cell 121, the first switch transistor V11, the inductor L, the third switch transistor V13, and the second battery cell 122, where the circuit is used for charging from the first battery cell 121 and the inductor L to the second battery cell 122, and the path of charge is: from the positive electrode of the first battery cell 121 to V11, to L, to V13, to the positive electrode of the second battery cell 122, to the negative electrode of the second battery cell 122, and to the negative electrode of the first battery cell 121. In addition, in order to keep this state unchanged, the third switch transistor V13 and the fourth switch transistor V14 may be controlled to be switched repeatedly, to control a charging time of the second battery cell 122.

Further, in addition to the first stage and the second stage, each heating period may include a third stage and a fourth stage. In the third stage, the second switch transistor V12 and the third switch transistor V13 are closed, and the first switch transistor V11 and the fourth switch transistor V14 are opened, to form a circuit including the second battery cell 122, the third switch transistor V13, the inductor L, and the second switch transistor V12, where the circuit is used for discharging of the second battery cell 122 and energy storage of the inductor L, and the path of discharge from the second battery cell 122 to the inductor L is: from the positive electrode of the second battery cell 122 to V13, to L, to V12, and to the negative electrode of the second battery cell 122. In the fourth stage, the first switch transistor V11 and the third switch transistor V13 are closed, and the second switch transistor V12 and the fourth switch transistor V14 are opened, to form a circuit including the second battery cell 122, the third switch transistor V13, the inductor L, the first switch transistor V11, and the first battery cell 121, where the circuit is used for charging from the second battery cell 122 and the inductor L to the first battery cell 121, and the path of charge is: from the positive electrode of the second battery cell 122 to V13, to L, to V11, to the positive electrode of the first battery cell 121, to the negative electrode of the first battery cell 121, and to the negative electrode of the second battery cell 122. In addition, in order to keep this state unchanged, the first switch transistor V11 and the second switch transistor V12 may be controlled to be switched repeatedly, to control a charging time of the first battery cell 121.

Similarly, in another implementation, for the heating module 1110 shown in FIGS. 3, 4 and 6, when the first battery cell 121 and the second battery cell 122 connected in series are to be heated, the control module 1120 may: control, in the first stage, the second sub-bridge arm 1102 and the third sub-bridge arm 1103 to be switched on at the same time, to form a circuit, which includes the first battery cell 121, the second sub-bridge arm 1102, the energy storage element 1113, and the third sub-bridge arm 1103, for discharging from the first battery cell 121 to the energy storage element 1113; and control, in the second stage, the second sub-bridge arm 1102 and the fourth sub-bridge arm 1104 to be switched on at the same time, to form a circuit, which includes the first battery cell 121, the second sub-bridge arm 1102, the energy storage element 1113, the fourth sub-bridge arm 1104, and the second battery cell 122, for charging from the first battery cell 121 and the energy storage element 1113 to the second battery cell 122; and the control module 1120 may also: control, in the third stage, the first sub-bridge arm 1101 and the fourth sub-bridge arm 1104 to be switched on at the same time, to form a circuit, which includes the second battery cell 122, the fourth sub-bridge arm 1104, the energy storage element 1113, and the first sub-bridge arm 1101, for discharging from the second battery cell 122 to the energy storage element 1113; and control, in the fourth stage, the second sub-bridge arm 1102 and the fourth sub-bridge arm 1104 to be switched on at the same time, to form a circuit, which includes the second battery cell 122, the fourth sub-bridge arm 1104, the energy storage element 1113, the second sub-bridge arm 1102, and the first battery cell 121, for charging from the second battery cell 122 and the energy storage element 1113 to the first battery cell 121. The control module 1120 may implement the switching on and off of each sub-bridge arm by controlling the corresponding switch transistor of each sub-bridge arm.

It can be seen that for the specific circuit structure of the heating module 1110, a reasonable control timing is designed to control the switching on and off of each sub-bridge arm in the heating module 1110 shown in FIGS. 3 to 6, to form a circuit for discharging from one of the battery cells to the energy storage element 1113 and a circuit for charging from the energy storage element 1113 and the battery cell to the other battery cell. The discharging circuit and the charging circuit are switched alternately, such that the two battery cells are heated at the same time during the charging and discharging, and a relatively high heating efficiency is thus achieved.

It should be understood that the heating module 1110 shown in FIG. 3 is merely an example, and each sub-bridge arm may also be implemented in other manners. For example, in a more preferred implementation shown in FIG. 4, the first sub-bridge arm 1101 may include the first switch transistor V11, and a first free-wheeling diode D11 connected in parallel to the first switch transistor V11; the second sub-bridge arm 1102 may include the second switch transistor V12, and a second free-wheeling diode D12 connected in parallel to the second switch transistor V12; the third sub-bridge arm 1103 may include the third switch transistor V13, and a third free-wheeling diode D13 connected in parallel to the third switch transistor V13; and the fourth sub-bridge arm 1104 may include the fourth switch transistor V14, and a fourth free-wheeling diode D14 connected in parallel to the fourth switch transistor V14.

Free-wheeling diodes are usually used along with an inductor. When the current of the inductor suddenly changes, the voltage across the inductor may suffer from an abrupt change, which may cause damage to other elements in the circuit. However, when the inductor is used along with a free-wheeling diode, the current of the inductor may change gently, which prevents an abrupt change in the voltage of the inductor, thereby improving the safety of the circuit.

By way of example, as shown in FIG. 4, when the heating period moves from the first stage to the second stage, i.e., when the third switch transistor V13 and the fourth switch transistor V14 are switched, the current may shortly persist in the path of discharge from the first battery cell 121 to the inductor L in the first stage due to a switching delay. In this case, the fourth free-wheeling diode D14 may buffer the current to prevent the abrupt change in the voltage, thereby improving the safety of the circuit.

It should be understood that in some cases, the first switch transistor V11 and the first free-wheeling diode connected in parallel thereto, the second switch transistor V12 and the second free-wheeling diode D12 connected in parallel thereto, the third switch transistor V13 and the third free-wheeling diode connected in parallel thereto, and the fourth switch transistor V14 and the fourth free-wheeling diode D14 connected in parallel thereto may each be referred to as an insulated gate bipolar transistor (IGBT).

Similarly, for the heating module 1110 shown in FIGS. 5 and 6, each sub-bridge arm may also include a switch transistor and a free-wheeling diode connected in parallel to the switch transistor, which is not further shown in the present application.

The specific form of each sub-bridge arm is not limited in the embodiments of the present application. When each sub-bridge arm does not include the corresponding free-wheeling diode, the function of the heating module 1110 may still be implemented.

The term "connected" or "connection" in the embodiments of the present application may be a direct connection, or an indirect connection via other elements, which is not limited in the present application.

The embodiments of the present application further provide a control method for a battery heating device. Here, for the structure of the battery heating device, reference may be made to the specific description for FIGS. 1 to 6, and details will not be repeated herein. As shown in FIG. 7, the control method 700 for a battery heating device includes either or both of the following steps:

in step 710, controlling the first bridge arm and the second bridge arm, to form a circuit for discharging from the first battery cell to the energy storage element and a circuit for charging from the energy storage element and the first battery cell to the second battery cell, for heating of the first battery cell and the second battery cell; and/or in step 720, controlling the first bridge arm and the second bridge arm, to form a circuit for discharging from the second battery cell to the energy storage element and a circuit for charging from the energy storage element and the second battery cell to the first battery cell, for heating of the first battery cell and the second battery cell.

Based on the above technical solutions, two battery cells may be heated at the same time. During charging and discharging, the two battery cells are connected in series. A reasonable control timing is designed to control the two bridge arms in the battery heating device, to form a circuit for discharging from one of the battery cells to the energy storage element and a circuit for charging from the energy storage element and the battery cell to the other battery cell. In this way, the two battery cells are heated at the same time during the charging and discharging, and a relatively high heating efficiency is thus achieved.

In an implementation, a first end of the first bridge arm is connected to a first end of the first battery cell, a first end of the second bridge arm is connected to a first end of the second battery cell, and a second end of the first bridge arm, a second end of the second bridge arm, and a second end of the first battery cell are connected to a second end of the second battery cell, where the first bridge arm includes a first sub-bridge arm and a second sub-bridge arm, and the second bridge arm includes a third sub-bridge arm and a fourth sub-bridge arm; and the first end of the first battery cell and the first end of the second battery cell are positive electrodes, and the second end of the first battery cell and the second end of the second battery cell are negative electrodes; or the first end of the first battery cell and the first end of the second battery cell are negative electrodes, and the second end of the first battery cell and the second end of the second battery cell are positive electrodes.

In a possible implementation, a first end of the energy storage element is connected between the first sub-bridge arm and the second sub-bridge arm, and a second end of the energy storage element is connected between the third sub-bridge arm and the fourth sub-bridge arm; or a first end of the energy storage element is connected to the second end of the first bridge arm, and a second end of the energy storage element is connected to the second end of the second bridge arm.

In a possible implementation, in step 710, the controlling the first bridge arm and the second bridge arm includes: receiving a heating request message; and generating a first control signal based on the heating request message, where the first control signal is used to: control the first sub-bridge arm and the fourth sub-bridge arm to be switched on at the same time, to form a circuit, which includes the first battery cell, the first sub-bridge arm, the energy storage element, and the fourth sub-bridge arm, for discharging from the first battery cell to the energy storage element; and control the first sub-bridge arm and the third sub-bridge arm to be switched on at the same time, to form a circuit, which includes the first battery cell, the first sub-bridge arm, the energy storage element, the third sub-bridge arm, and the second battery cell, for charging from the first battery cell and the energy storage element to the second battery cell.

In a possible implementation, in step 720, the controlling the first bridge arm and the second bridge arm includes: receiving a heating request message; and generating a first control signal based on the heating request message, where the first control signal is used to: control the second sub-bridge arm and the third sub-bridge arm to be switched on at the same time, to form a circuit, which includes the second battery cell, the third sub-bridge arm, the energy storage element, and the second sub-bridge arm, for discharging from the second battery cell to the energy storage element; and control the first sub-bridge arm and the third sub-bridge arm to be switched on at the same time, to form a circuit, which includes the second battery cell, the third sub-bridge arm, the energy storage element, the first sub-bridge arm, and the first battery cell, for charging from the second battery cell and the energy storage element to the first battery cell.

In a possible implementation, a first end of the energy storage element is connected between the first sub-bridge arm and the second sub-bridge arm, and a second end of the energy storage element is connected between the third sub-bridge arm and the fourth sub-bridge arm; or a first end of the energy storage element is connected to the first end of the first bridge arm, and a second end of the energy storage element is connected to the first end of the second bridge arm.

In a possible implementation, in step 710, the controlling the first bridge arm and the second bridge arm includes: receiving a heating request message; and generating a third control signal based on the heating request message, where the third control signal is used to: control the second sub-bridge arm and the third sub-bridge arm to be switched on at the same time, to form a circuit, which includes the first battery cell, the second sub-bridge arm, the energy storage element, and the third sub-bridge arm, for discharging from the first battery cell to the energy storage element; and control the second sub-bridge arm and the fourth sub-bridge arm to be switched on at the same time, to form a circuit, which includes the first battery cell, the second sub-bridge arm, the energy storage element, the fourth sub-bridge arm, and the second battery cell, for charging from the first battery cell and the energy storage element to the second battery cell.

In a possible implementation, in step 720, the controlling the first bridge arm and the second bridge arm includes: receiving a heating request message; and generating a third control signal based on the heating request message, where the third control signal is used to: control the first sub-bridge arm and the fourth sub-bridge arm to be switched on at the same time, to form a circuit, which includes the second battery cell, the fourth sub-bridge arm, the energy storage element, and the first sub-bridge arm, for discharging from the second battery cell to the energy storage element; and control the second sub-bridge arm and the fourth sub-bridge arm to be switched on at the same time, to form a circuit, which includes the second battery cell, the fourth sub-bridge arm, the energy storage element, the second sub-bridge arm, and the first battery cell, for charging from the second battery cell and the energy storage element to the first battery cell.

In a possible implementation, the control method further includes: receiving a heating stop message; and generating a second control signal based on the heating stop message, where the second control signal is used to control the battery heating device to stop heating the traction battery.

In an implementation, the first sub-bridge arm includes a first switch transistor, the second sub-bridge arm includes a second switch transistor, the third sub-bridge arm includes a third switch transistor, and the fourth sub-bridge arm includes a fourth switch transistor. The switching on and off of the first sub-bridge arm, the second sub-bridge arm, the third sub-bridge arm, and the fourth sub-bridge arm are respectively implemented by controlling the first switch transistor, the second switch transistor, the third switch transistor, and the fourth switch transistor.

In an implementation, a state switching switch is connected between the first end of the first battery cell and the first end of the second battery cell, or a state switching switch is connected between the second end of the first battery cell and the second end of the second battery cell. The control method further includes: controlling the state switching switch to be opened, so that the first battery cell is connected in series with the second battery cell.

In an implementation, the energy storage element includes an inductor; or the energy storage element includes an inductor and a first capacitor connected in series.

In an implementation, a second capacitor is connected in parallel to the first battery cell at the two ends, and a third capacitor is connected in parallel to the second battery cell at the two ends.

In an implementation, the first battery cell and the second battery cell are further connected to a drive circuit of a motor, to provide power to the drive circuit.

It should be understood that, for specific control of each bridge arm and the resulting benefit effects in the method embodiments, reference may be made to the corresponding description in the device embodiments, and details will not be repeated herein for the sake of brevity.

FIG. 8 is a schematic block diagram of a control circuit 800 for a battery heating device according to an embodiment of the present application. As shown in FIG. 8, the control circuit 800 includes a processor 820. Optionally, the control circuit 800 further includes a memory 810. The memory 810 is configured to store instructions. The processor 820 is configured to read the instructions, and perform, according to the instructions, the methods in the foregoing embodiments of the present application.

The processor 820 may, for example, correspond to the control module of any of the battery heating devices described above.

Figure 9:
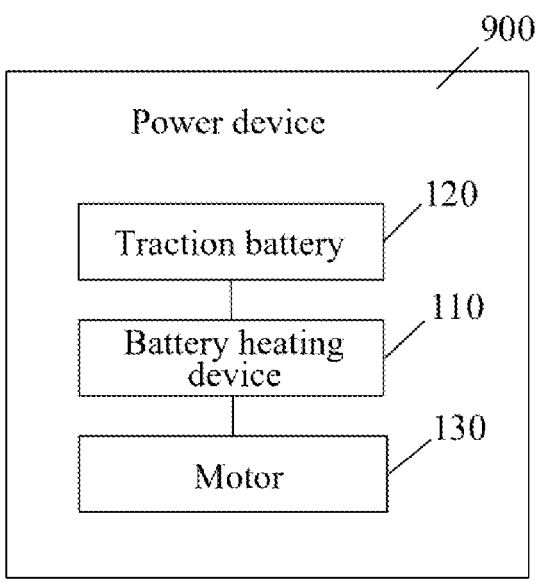
FIG. 9 is a schematic block diagram of a power device according to an embodiment of the present application.

FIG. 9 is a schematic block diagram of a power device 900 according to an embodiment of the present application. The power device 900 includes: a traction battery 120; a battery heating device 110 in any of the embodiments described above, where the battery heating device 110 is connected to the traction battery 120 and configured to heat the traction battery 120; and a motor 130, where a drive circuit 131 of the motor 130 is connected to the traction battery 120, and the traction battery 120 is configured to provide power to the drive circuit 131.

The power device 900 may be, for example, an electric vehicle.

An embodiment of the present application further provides a readable storage medium for storing a computer program, where the computer program is used to execute the methods in the foregoing embodiments of the present application.

Those of ordinary skill in the art would have realized that the units and algorithm steps of various examples described with reference to the embodiments disclosed herein may be implemented in electronic hardware, or a combination of computer software and electronic hardware. Whether these functions are performed in hardware or software depends on the specific application and design constraints of the technical solution. Professional technical personnel may implement the described functions by using different methods for each particular application, but such implementation should not be considered beyond the scope of the present application.

A person skilled in the art would clearly understand that for convenience and brevity of the description, for the specific operating process of the systems, devices and units described above, reference may be made to the corresponding process in the foregoing method embodiments, and details will not be described herein again.

In several embodiments provided in the present application, it should be understood that the disclosed systems, devices and methods may be implemented in other manners. For example, the device embodiments described above are merely illustrative. For example, the division of the units is merely division of logical functions, and there may be additional division manners during actual implementation. For example, a plurality of units or components may be combined or integrated into another system, or some features may be omitted or not executed. Additionally, the displayed or discussed mutual couplings or direct couplings or communication connections may be implemented by some interfaces. The indirect couplings or communication connections between devices or units may be implemented in electrical, mechanical or other forms.

The units illustrated as separate components may be or may not be physically separate, and the components shown as units may be or may not be physical units, which may be located at one place, or may be distributed on a plurality of network units. The object of the solutions of the embodiments can be achieved by selecting some or all of the units according to actual requirements.

The invention claimed is:

1. A battery heating device, which is connected to a traction battery and configured to heat the traction battery, wherein the traction battery comprises a first battery cell and a second battery cell, the battery heating device comprising:
  a heating module comprising a first bridge arm, a second bridge arm, and an energy storage element; and
  a control module configured to control the first bridge arm and the second bridge arm, to form a circuit for discharging from the first battery cell to the energy storage element and a circuit for charging from the energy storage element and the first battery cell to the second battery cell, and/or to form a circuit for discharging from the second battery cell to the energy storage element and a circuit for charging from the energy storage element and the second battery cell to the first battery cell, for heating of the first battery cell and the second battery cell;
  wherein a state switching switch is connected between the first end of the first battery cell and the first end of the second battery cell, or a state switching switch is connected between the second end of the first battery cell and the second end of the second battery cell; and
  wherein the control module is further configured to:

control the state switching switch to be opened, so that the first battery cell is connected in series with the second battery cell.

2. The battery heating device according to claim 1, wherein
  a first end of the first bridge arm is connected to a first end of the first battery cell, a first end of the second bridge arm is connected to a first end of the second battery cell, and a second end of the first bridge arm, a second end of the second bridge arm, and a second end of the first battery cell are connected to a second end of the second battery cell, wherein the first bridge arm comprises a first sub-bridge arm and a second sub-bridge arm, and the second bridge arm comprises a third sub-bridge arm and a fourth sub-bridge arm; and
  the first end of the first battery cell is a positive electrode of the first battery cell, the second end of the first battery cell is a negative electrode of the first battery cell, the first end of the second battery cell is a positive electrode of the second battery cell, and the second end of the second battery cell is a negative electrode of the second battery cell; or the first end of the first battery cell is a negative electrode of the first battery cell, the second end of the first battery cell is a positive electrode of the first battery cell, the first end of the second battery cell is a negative electrode of the second battery cell, and the second end of the second battery cell is a positive electrode of the second battery cell.

3. The battery heating device according to claim 2, wherein
  a first end of the energy storage element is connected between the first sub-bridge arm and the second sub-bridge arm, and a second end of the energy storage element is connected between the third sub-bridge arm and the fourth sub-bridge arm; or
  a first end of the energy storage element is connected to the second end of the first bridge arm, and a second end of the energy storage element is connected to the second end of the second bridge arm.

4. The battery heating device according to claim 3, wherein the control module is configured to:
  control the first sub-bridge arm and the fourth sub-bridge arm to be switched on at the same time, to form a circuit, which comprises the first battery cell, the first sub-bridge arm, the energy storage element, and the fourth sub-bridge arm, for discharging from the first battery cell to the energy storage element;
  control the first sub-bridge arm and the third sub-bridge arm to be switched on at the same time, to form a circuit, which comprises the first battery cell, the first sub-bridge arm, the energy storage element, the third sub-bridge arm, and the second battery cell, for charging from the first battery cell and the energy storage element to the second battery cell;
  control the second sub-bridge arm and the third sub-bridge arm to be switched on at the same time, to form a circuit, which comprises the second battery cell, the third sub-bridge arm, the energy storage element, and the second sub-bridge arm, for discharging from the second battery cell to the energy storage element; and
  control the first sub-bridge arm and the third sub-bridge arm to be switched on at the same time, to form a circuit, which comprises the second battery cell, the third sub-bridge arm, the energy storage element, the first sub-bridge arm, and the first battery cell, for charging from the second battery cell and the energy storage element to the first battery cell.

5. The battery heating device according to claim 2, wherein
  a first end of the energy storage element is connected between the first sub-bridge arm and the second sub-bridge arm, and a second end of the energy storage element is connected between the third sub-bridge arm and the fourth sub-bridge arm; or
  a first end of the energy storage element is connected to the first end of the first bridge arm, and a second end of the energy storage element is connected to the first end of the second bridge arm.

6. The battery heating device according to claim 5, wherein the control module is specifically configured to:
  control the second sub-bridge arm and the third sub-bridge arm to be switched on at the same time, to form a circuit, which comprises the first battery cell, the second sub-bridge arm, the energy storage element, and the third sub-bridge arm, for discharging from the first battery cell to the energy storage element;
  control the second sub-bridge arm and the fourth sub-bridge arm to be switched on at the same time, to form a circuit, which comprises the first battery cell, the second sub-bridge arm, the energy storage element, the fourth sub-bridge arm, and the second battery cell, for charging from the first battery cell and the energy storage element to the second battery cell;
  control the first sub-bridge arm and the fourth sub-bridge arm to be switched on at the same time, to form a circuit, which comprises the second battery cell, the fourth sub-bridge arm, the energy storage element, and the first sub-bridge arm, for discharging from the second battery cell to the energy storage element; and
  control the second sub-bridge arm and the fourth sub-bridge arm to be switched on at the same time, to form a circuit, which comprises the second battery cell, the fourth sub-bridge arm, the energy storage element, the second sub-bridge arm, and the first battery cell, for charging from the second battery cell and the energy storage element to the first battery cell.

7. The battery heating device according to claim 2, wherein
  the first sub-bridge arm comprises a first switch transistor, the second sub-bridge arm comprises a second switch transistor, the third sub-bridge arm comprises a third switch transistor, and the fourth sub-bridge arm comprises a fourth switch transistor,
  wherein the control module implements the switching on and off of the first sub-bridge arm, the second sub-bridge arm, the third sub-bridge arm, and the fourth sub-bridge arm respectively by controlling the first switch transistor, the second switch transistor, the third switch transistor, and the fourth switch transistor.

8. The battery heating device according to claim 1, wherein a second capacitor is connected in parallel to the first battery cell at the two ends, and a third capacitor is connected in parallel to the second battery cell at the two ends.

9. A power device, comprising:
  a traction battery comprising a first battery cell and a second battery cell;
  a battery heating device according to claim 1, which is connected to the traction battery and configured to heat the traction battery; and
  a motor, wherein a drive circuit of the motor is connected to the traction battery, and the traction battery is configured to provide power to the drive circuit.

10. A control method for a battery heating device, which is connected to a traction battery and configured to heat the traction battery, wherein the battery heating device comprises a first bridge arm, a second bridge arm, and an energy storage element, and the traction battery comprises a first battery cell and a second battery cell, the control method comprising:
  controlling the first bridge arm and the second bridge arm, to form a circuit for discharging from the first battery cell to the energy storage element and a circuit for charging from the energy storage element and the first battery cell to the second battery cell, and/or to form a circuit for discharging from the second battery cell to the energy storage element and a circuit for charging from the energy storage element and the second battery cell to the first battery cell, for heating of the first battery cell and the second battery cell;
  wherein a state switching switch is connected between the first end of the first battery cell and the first end of the second battery cell, or a state switching switch is connected between the second end of the first battery cell and the second end of the second battery cell; and
  wherein the control method further comprises:
  controlling the state switching switch to be opened, so that the first battery cell is connected in series with the second battery cell.

11. The control method according to claim 10, wherein
  a first end of the first bridge arm is connected to a first end of the first battery cell, a first end of the second bridge arm is connected to a first end of the second battery cell, and a second end of the first bridge arm, a second end of the second bridge arm, and a second end of the first battery cell are connected to a second end of the second battery cell, wherein the first bridge arm comprises a first sub-bridge arm and a second sub-bridge arm, and the second bridge arm comprises a third sub-bridge arm and a fourth sub-bridge arm; and
  the first end of the first battery cell and the first end of the second battery cell are positive electrodes, and the second end of the first battery cell and the second end of the second battery cell are negative electrodes; or the first end of the first battery cell and the first end of the second battery cell are negative electrodes, and the second end of the first battery cell and the second end of the second battery cell are positive electrodes.

12. The control method according to claim 11, wherein
  a first end of the energy storage element is connected between the first sub-bridge arm and the second sub-bridge arm, and a second end of the energy storage element is connected between the third sub-bridge arm and the fourth sub-bridge arm; or
  a first end of the energy storage element is connected to the second end of the first bridge arm, and a second end of the energy storage element is connected to the second end of the second bridge arm.

13. The control method according to claim 12, wherein the controlling the first bridge arm and the second bridge arm comprises:
  receiving a heating request message; and
  generating a first control signal based on the heating request message, wherein the first control signal is used to:
  control the first sub-bridge arm and the fourth sub-bridge arm to be switched on at the same time, to form a circuit, which comprises the first battery cell, the first sub-bridge arm, the energy storage element, and the fourth sub-bridge arm, for discharging from the first battery cell to the energy storage element;

control the first sub-bridge arm and the third sub-bridge arm to be switched on at the same time, to form a circuit, which comprises the first battery cell, the first sub-bridge arm, the energy storage element, the third sub-bridge arm, and the second battery cell, for charging from the first battery cell and the energy storage element to the second battery cell;

control the second sub-bridge arm and the third sub-bridge arm to be switched on at the same time, to form a circuit, which comprises the second battery cell, the third sub-bridge arm, the energy storage element, and the second sub-bridge arm, for discharging from the second battery cell to the energy storage element; and control the first sub-bridge arm and the third sub-bridge arm to be switched on at the same time, to form a circuit, which comprises the second battery cell, the third sub-bridge arm, the energy storage element, the first sub-bridge arm, and the first battery cell, for charging from the second battery cell and the energy storage element to the first battery cell.

14. The control method according to claim 13, wherein the control method further comprises:

receiving a heating stop message; and generating a second control signal based on the heating stop message, wherein the second control signal is used to control the battery heating device to stop heating the traction battery.

15. The control method according to claim 11, wherein a first end of the energy storage element is connected between the first sub-bridge arm and the second sub-bridge arm, and a second end of the energy storage element is connected between the third sub-bridge arm and the fourth sub-bridge arm; or a first end of the energy storage element is connected to the first end of the first bridge arm, and a second end of the energy storage element is connected to the first end of the second bridge arm.

16. The control method according to claim 15, wherein the controlling the first bridge arm and the second bridge arm comprises:

receiving a heating request message; and generating a third control signal based on the heating request message, wherein the third control signal is used to:

control the second sub-bridge arm and the third sub-bridge arm to be switched on at the same time, to form a circuit, which comprises the first battery cell, the second sub-bridge arm, the energy storage element, and the third sub-bridge arm, for discharging from the first battery cell to the energy storage element;

control the second sub-bridge arm and the fourth sub-bridge arm to be switched on at the same time, to form a circuit, which comprises the first battery cell, the second sub-bridge arm, the energy storage element, the fourth sub-bridge arm, and the second battery cell, for charging from the first battery cell and the energy storage element to the second battery cell;

control the first sub-bridge arm and the fourth sub-bridge arm to be switched on at the same time, to form a circuit, which comprises the second battery cell, the fourth sub-bridge arm, the energy storage element, and the first sub-bridge arm, for discharging from the second battery cell to the energy storage element; and control the second sub-bridge arm and the fourth sub-bridge arm to be switched on at the same time, to form a circuit, which comprises the second battery cell, the fourth sub-bridge arm, the energy storage element, the second sub-bridge arm, and the first battery cell, for charging from the second battery cell and the energy storage element to the first battery cell.

17. The control method according to claim 11, wherein the first sub-bridge arm comprises a first switch transistor, the second sub-bridge arm comprises a second switch transistor, the third sub-bridge arm comprises a third switch transistor, and the fourth sub-bridge arm comprises a fourth switch transistor, wherein the switching on and off of the first sub-bridge arm, the second sub-bridge arm, the third sub-bridge arm, and the fourth sub-bridge arm are respectively implemented by controlling the first switch transistor, the second switch transistor, the third switch transistor, and the fourth switch transistor.

18. The control method according to claim 10, wherein a second capacitor is connected in parallel to the first battery cell at the two ends, and a third capacitor is connected in parallel to the second battery cell at the two ends.

* * * * *